United States Patent
Schmidt et al.

(10) Patent No.: US 12,541,515 B2
(45) Date of Patent: *Feb. 3, 2026

(54) ONE-HOT ENCODER USING LAZY EVALUATION OF RELATIONAL STATEMENTS

(71) Applicant: Oracle International Corporation, Redwood Shores, CA (US)

(72) Inventors: Felix Schmidt, Baden-Dattwil (CH); Matteo Casserini, Zurich (CH); Milos Vasic, Zurich (CH); Marija Nikolic, Zurich (CH)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/955,689

(22) Filed: Nov. 21, 2024

(65) Prior Publication Data

US 2025/0077519 A1    Mar. 6, 2025

Related U.S. Application Data

(63) Continuation of application No. 17/964,084, filed on Oct. 12, 2022, now Pat. No. 12,182,122.

(51) Int. Cl.
   *G06F 16/00* (2019.01)
   *G06F 16/2453* (2019.01)
   *G06F 16/2458* (2019.01)

(52) U.S. Cl.
   CPC .... *G06F 16/24544* (2019.01); *G06F 16/2471* (2019.01)

(58) Field of Classification Search
   None
   See application file for complete search history.

(56) References Cited

U.S. PATENT DOCUMENTS

| | | |
|---|---|---|
| 7,788,255 B2 | 8/2010 | Sethi |
| 7,801,882 B2 | 9/2010 | Cunningham |
| (Continued) | | |

FOREIGN PATENT DOCUMENTS

| | | | | |
|---|---|---|---|---|
| KR | 102359090 B1 | * | 2/2022 | ............ G06V 10/20 |

OTHER PUBLICATIONS

"Joins on encoded and partitioned data", Lee et al., Havard Library (Year: 2014).*

(Continued)

*Primary Examiner* — Jean M Corrielus
(74) *Attorney, Agent, or Firm* — Hickman Becker Bingham Ledesma LLP; Stephen R. Tkacs

(57) ABSTRACT

A method and one or more non-transitory storage media are provided to train and implement a one-hot encoder. During a training phase, computation of an encoder state is performed by executing a set of relational statements to extract unique categories in a first training data set, associate each unique category with a unique index, and generate a one-hot encoding for each unique category. The set of relational statements are executed by a query optimization engine. Execution of the set of relational statements is postponed until a result of each relational statement is needed, and the query optimization engine implements one or more optimizations when executing the set of relational statements. During an encoding phase, a set of categorical features in a second training data set are encoded based on the encoder state to form a set of encoded categorical features.

20 Claims, 7 Drawing Sheets

(56) References Cited

U.S. PATENT DOCUMENTS

| | | | |
|---|---|---|---|
| 8,280,869 | B1 | 10/2012 | Burger |
| 8,812,485 | B2 | 8/2014 | Chen |
| 8,924,981 | B1 | 12/2014 | Brown |
| 9,785,708 | B2* | 10/2017 | Kulkarni ............ G06F 16/9538 |
| 10,726,010 | B2 | 7/2020 | Ahmed |
| 10,944,789 | B2* | 3/2021 | Correa Bahnsen ........................ H04L 63/1483 |
| 11,169,985 | B2 | 11/2021 | Innocenti |
| 12,182,668 | B2* | 12/2024 | Rosenfeld ............ G06N 3/0895 |
| 2005/0165802 | A1* | 7/2005 | Sethi ...................... G06F 16/252 |
| 2006/0074965 | A1* | 4/2006 | Cunningham ........ G06F 16/221 707/999.102 |
| 2011/0270857 | A1 | 11/2011 | Bommireddipalli |
| 2013/0054568 | A1* | 2/2013 | Chen ................ G06F 16/24542 707/718 |
| 2013/0262448 | A1 | 10/2013 | Shiraki |
| 2014/0067789 | A1* | 3/2014 | Ahmed ............. G06F 16/24544 707/E17.017 |
| 2014/0258266 | A1* | 9/2014 | Cruanes ............ G06F 16/24542 707/718 |
| 2014/0372411 | A1* | 12/2014 | Attaluri ............. G06F 16/90335 707/722 |
| 2014/0372470 | A1 | 12/2014 | Attaluri |
| 2015/0254344 | A1 | 9/2015 | Kulkarni |
| 2016/0253390 | A1 | 9/2016 | Attaluri |
| 2018/0144029 | A1 | 5/2018 | Cruanes |
| 2018/0248903 | A1 | 8/2018 | Villella |
| 2018/0248904 | A1 | 8/2018 | Villella |
| 2018/0357565 | A1* | 12/2018 | Syed ...................... G06N 20/10 |
| 2020/0036750 | A1* | 1/2020 | Bahnsen ............ H04L 63/1416 |
| 2020/0050612 | A1* | 2/2020 | Bhattacharjee ..... G06F 16/2471 |
| 2020/0065303 | A1* | 2/2020 | Bhattacharjee ....... G06F 16/278 |
| 2020/0184371 | A1 | 6/2020 | Prieditis |
| 2020/0234158 | A1* | 7/2020 | Pai ...................... G06N 3/0499 |
| 2020/0257982 | A1* | 8/2020 | Kim ...................... G06N 20/10 |
| 2020/0349469 | A1 | 11/2020 | Katzenberger |
| 2021/0004670 | A1 | 1/2021 | Tripathi |
| 2021/0073221 | A1 | 3/2021 | Chavan |
| 2021/0081409 | A1 | 3/2021 | Rath |
| 2021/0089842 | A1* | 3/2021 | Rosenfeld ........... G06F 18/2431 |
| 2021/0110423 | A1 | 4/2021 | Sahoo |
| 2021/0141801 | A1 | 5/2021 | Teague |
| 2021/0232930 | A1* | 7/2021 | Alakuijala ............. G06N 3/049 |
| 2021/0256417 | A1 | 8/2021 | Kneller |
| 2022/0046057 | A1 | 2/2022 | Kutt |
| 2022/0076164 | A1* | 3/2022 | Conort ................... G06N 20/00 |
| 2022/0076828 | A1 | 3/2022 | Zhang |
| 2022/0406016 | A1 | 12/2022 | Gibbs |
| 2023/0080686 | A1 | 3/2023 | Gupta |
| 2023/0245258 | A1 | 8/2023 | Ma |
| 2023/0367773 | A1 | 11/2023 | Kondiles |
| 2024/0078711 | A1 | 3/2024 | Dean |

OTHER PUBLICATIONS

"A Deep-Learned Embedding Technique for Categorical Features Encoding", MWAMBA et al., (Year: 2021).*

Schmidt, U.S. Appl. No. 17/964,084, filed Oct. 12, 2022, Non-Final Rejection.

Pedregosa, Fabian et al., "Scikit-learn: Machine Learning in Python", Journal of Machine Learning Research 12, 2011, pp. 2825-2830.

Meng, Xiangrui et al., "MLlib: Machine Learning in Apache Spark", The Journal of Machine Learning Research 17.1. 2016, pp. 1235-1241.

Hughes, John, "Why Functional Programming Matters", The computer journal 32.2 (1989), 23 pages.

Bagui, Sikha, et al., "Machine learning and deep learning for phishing email classification using one-hot encoding", https://doi.org/10.3844/jcssp.2021.610.623, 2021, 15pgs.

Armbrust, Michael et al., "Spark SQL: Relational Data Processing in Spark", Proceedings of the 2015 ACM SIGMOD international conference on management of data, 2015, 12 pages.

"One-hot", Wikipedia, available: http://en.wikipedia.org/wiki/Inductor, retrieved Jul. 26, 2022.

* cited by examiner

FIG. 8

| Sample Size | MLlib CV [sec] | MLlib OHE [sec] | Lazy OHE [sec] |
|---|---|---|---|
| 100 | 7.69 | 7.47 | 12.27 |
| 1000 | 7.82 | 7.49 | 13.58 |
| 10000 | 8.92 | 8.93 | 14.54 |
| 50000 | 10.93 | 618.28 | 18.68 |
| 100000 | 12.40 | 4368.78 | 22.71 |
| 1000000 | 46.10 | experiment manually stopped after 18h | 55.26 |
| 10000000 | 418.53 | experiment not attempted | 395.98 |
| 50000000 | experiment failed due to memory issues | experiment not attempted | 2096.50 |
| 100000000 | experiment failed due to memory issues | experiment not attempted | 4273.29 |

FIG. 9

| Sample Size | MLlib CV [sec] | MLlib OHE [sec] | Lazy OHE [sec] |
|---|---|---|---|
| 50000 | 12.24 | 16.11 | 17.63 |
| 100000 | 12.68 | 18.16 | 21.55 |
| 1000000 | 22.59 | 30.04 | 29.26 |
| 10000000 | 82.90 | 97.01 | 81.18 |
| 50000000 | 327.28 | 413.36 | 312.77 |
| 100000000 | 645.36 | 810.88 | 600.61 |
| 1000000000 | 6183.38 | 8883.14 | 5906.94 |

FIG. 10

| Sample Size | Lazy OHE - unoptimized [sec] | Lazy OHE - optimized [sec] | Percentage Improvement [%] |
|---|---|---|---|
| 1000 | 13.19 | 9.77 | 25.93 |
| 10000 | 14.25 | 11.72 | 17.76 |
| 50000 | 14.77 | 12.11 | 18.01 |
| 100000 | 15.73 | 13.00 | 17.36 |
| 1000000 | 23.08 | 21.81 | 5.50 |
| 10000000 | 78.20 | 73.08 | 6.55 |
| 50000000 | 316.86 | 294.86 | 6.95 |
| 100000000 | 606.98 | 577.65 | 4.83 |
| 1000000000 | 6091.55 | 5896.56 | 3.20 |

ONE-HOT ENCODER USING LAZY EVALUATION OF RELATIONAL STATEMENTS

CROSS-REFERENCE TO RELATED APPLICATIONS; BENEFIT CLAIM

This application is a Continuation of prior U.S. patent application Ser. No. 17/964,084 entitled "ONE-HOT ENCODER USING LAZY EVALUATION OF RELATIONAL STATEMENTS," filed Oct. 12, 2022, the contents of which are incorporated by reference for all purposes as if fully set forth herein.

FIELD OF THE INVENTION

The present invention relates to encoding categorical features for machine learning at scale and, more particularly, to a one-hot encoder using lazy evaluation of relational statements.

BACKGROUND

Machine learning (ML) is a field of computer science that involves building algorithms or models to improve performance on a set of tasks. ML algorithms can make predictions or decisions without being explicitly programmed to do so by "learning" from a training data set, which is a set of data samples used to fit the parameters of the ML algorithm or model. The fitted model can be used to predict the responses for the observations in a second data set, called the validation data set, which provides an unbiased evaluation of a model fit on the training data set. Finally, the test data set is a data set used to provide an unbiased evaluation of a final model fit on the training data set. The training data set, validation data set, and test data set comprise input data sets, which consist of observations made up of vectors of features.

Categorical features are usually represented as strings or categories and are finite in number. Categorical features can be divided into two categories: nominal and ordinal. Nominal features (e.g., color, country, species) have no inherent order, whereas ordinal features (e.g., age, education level, severity) have an inherent order.

Most ML algorithms only accept numerical features. The encoding of categorical features is a necessary step toward enabling ML algorithms to utilize the information these features contain. For this purpose, one-hot encoding (OHE) is often employed. OHE is an encoding technique that creates an index for each level of a categorical feature and maps each index to a binary variable containing either a 0 or 1 value, such that a 0 represents an absence of the category and a 1 value represents presence of the category. Certain computational steps involved in this encoding scheme can be serious computational bottlenecks if not adjusted for the context of large-scale data processing. What is needed is an approach for encoding categorical features, particularly nominal features, efficiently for ML applications at scale.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 8 is a table showing results of existing encoding approaches and a lazy one-hot encoder where cardinality of a considered feature equals sample size in accordance with an illustrative embodiment.

FIG. 9 is a table showing results where a feature with fixed cardinality is encoded in accordance with an illustrative embodiment.

FIG. 10 is a table showing results related to improvements for optimized lazy one-hot encoder in accordance with an illustrative embodiment.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Categorical features represent discrete values that belong to a specific finite set of categories or classes. These features are typically represented as text. For instance, Red, Yellow, Green, Blue are some values that the categorical feature Color can take. Most machine learning (ML) algorithms cannot handle categorical variables unless they are converted to numerical values. The simplest way to represent categorical values as number is to assign a unique integer to each category. This method is simple, but it implies implicit ordering, which in most cases has little semantic support.

Figures 1, 2:
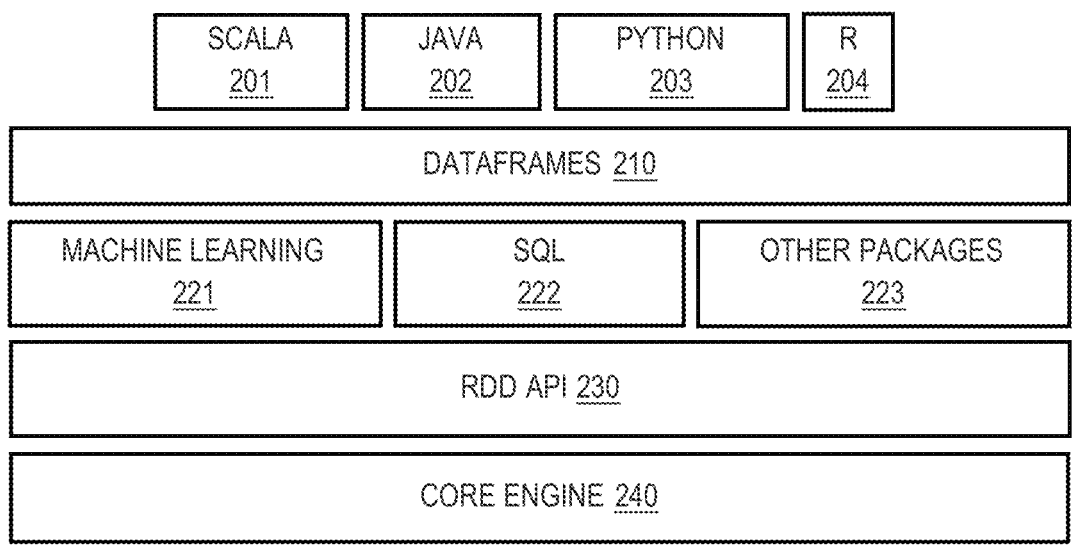
FIG. 1 illustrates one-hot encoder training in accordance with one embodiment.
FIG. 2 illustrates the main components of a distributed data processing framework in accordance with an embodiment.

One-hot encoding (OHE) solves the issue of implicit ordering. The process of OHE consists of two phases, the training of the encoder and the encoding of input data. During the training phase, the OHE learns unique categories for a given feature and assigns a unique index to each distinct category. FIG. 1 illustrates one-hot encoder training in accordance with one embodiment. The input data includes a plurality of instances of categorical features. The OHE training output includes a unique index assigned to each unique category in the input data set. This information is used during encoding to represent each category as a vector. The size of the vector is typically equal to the number of unique categories, unless an unseen category is required). Each category is uniquely represented by placing a value of 1 (one) at the element of the vector that corresponds to a given category, as determined based on the associated index, and a value of 0 (zero) elsewhere in the vector. For instance, the example presented in FIG. 1 would imply that the category Blue is encoded as (1, 0, 0, 0) and the category of Red as (0, 0, 0, 1). Resulting vectors are referred to as one-hot vectors.

Different commercially available machine learning (ML) libraries provide tools for handling categorical features, including OHE. Typical examples include Scikit-learn, a machine learning library for the Python® programming language that provides an eager and non-distributed OHE algorithm. PYTHON is a registered trademark of the Python Software Foundation (PSF) in the United States, other countries, or both. The Apache Spark™ distributed data processing framework includes MLlib, which is a library that provides two different distributed implementations, MLlib OHE and MLlib CV. APACHE SPARK is a trademark of the Apache Software Foundation (ASF) in the United States, other countries, or both. MLlib OHE and MLlib CV rely on eager evaluation. That is, with eager evaluation, the logic requires an immediate evaluation of unique categories during training. This evaluation pattern can thus negatively affect computational performance in large-scale data environments.

In accordance with an illustrative embodiment, a lazy approach to OHE training is implemented to reduce the load on the driver side and related space requirements. By delaying the evaluation of an expression until its value is needed, different optimizations are allowed to take place. This implementation can be beneficial in the case of OHE training and encoding and in large-scale data environments. The illustrative embodiment provides an OHE training and encoding where materialization of the unique categories is not needed, and the processing steps can be evaluated lazily. The OHE training and encoding of the illustrative embodiment can be implemented using Apache Spark™ relational application programming interface (API) and DataFrame (DF) API, which together with lazy evaluation allows for important performance benefits.

During a training phase, the illustrative embodiment performs computation of an encoder state for a one-hot encoder (OHE) by executing a set of relational statements to extract unique categories in a first training data set, associate each unique category with a unique index, and generate a one-hot encoding for each unique category. A relational statement is a query or statement for performing an operation on data contained in two or more tables in a relational database. A relational statement specifies the tables required and what the condition is that links them. The set of relational statements are executed by a query optimization engine. An example of a language in which relational statements may be constructed is SQL. SQL is supported by many database servers running software from various vendors, such as Oracle™. SQL includes official standard forms of SQL promulgated from ANSI (American National Standards Institute) and proprietary forms of SQL supported by such database server vendors such as Oracle™. Another form of SQL is Spark™ SQL.

The term "query optimization engine," as used herein, refers to a distributed data processing framework for large-scale query processing with optimizations. Execution of the set of relational statements is postponed until a result of each relational statement is needed, and the query optimization engine implements one or more optimizations when executing the set of relational statements. During an encoding phase, the OHE encodes a set of categorical features in a second training data set based on the encoder state to form a set of encoded categorical features.

In one embodiment, the one-hot encoding for a given category comprises a sparse vector having a length based on a number of unique categories in the plurality of unique categories and a value of one in an element of the sparse vector according to an index of the given category. In an example embodiment, the encoder state comprises an encoder state table including a category column storing the plurality of unique categories and a one-hot vector column storing the sparse vectors corresponding to the plurality of unique categories. The encoder state table can also include an index column storing the consecutive indexes corresponding to the plurality of unique categories and a length column storing the length of the sparse vector.

In an embodiment, encoding the set of categorical features comprises generating an input data frame for the set of categorical features in the second training data set and performing a distributed join operation between the input data frame and the encoder state table using a value of the categorical features as a join key. The distributed join operation can comprise executing a plurality of lookup operations in parallel.

In one embodiment, the join operation is performed by the query optimization engine, which performs a plurality of lookup operations. Execution of the plurality of lookup operations is postponed until a result of each lookup operation is needed, and the query optimization engine implements one or more optimizations when executing the plurality of lookup operations.

While the illustrative embodiments are described with respect to the Spark™ distributed data processing framework, the aspects of the illustrative embodiments can apply to other distributed data processing frameworks having query optimization and other lazy evaluation capabilities.

Distributed Data Processing

Data science and machine learning (ML) at scale cannot be solved practically on one computer node alone. A framework for distributed data processing, such as Apache Spark™, provides support for ML for large, distributed data sets. FIG. 2 illustrates the main components of a distributed data processing framework in accordance with an embodiment. Applications written in popular languages, such as the Scala programming language 201, the Java™ programming language 202, the Python™ programming language 203, and the R programming language 204, can make use of the distributed data processing framework. JAVA is a registered trademark of Oracle and/or its affiliates in the United States, other countries, or both.

The Spark™ core engine 240 is a component that contains the basic functionality of the Apache Spark™ distributed data processing framework. This includes components for task scheduling, memory management, fault tolerance, interacting with storage systems, etc. Resilient distributed datasets (RDD) is the fundamental data structure of the Apache Spark™ distributed data processing framework and is also defined within the Spark™ core engine 240. RDDs represent a collection of items without schema. RDDs are built across many compute nodes that can be manipulated in parallel via the RDD API 230. RDD has no built-in optimization engine for RDDs, which means that code must be optimized by developers themselves. The Spark™core engine 240 provides many APIs for building and manipulating these data collections, including the RDD API 230.

The distributed data processing framework depicted in FIG. 2 also includes the following packages: machine learning package 221, SQL package 222, and other packages 223. In an embodiment, the machine learning package 221 is a library containing common ML functionality. MLlib provides multiple types of machine learning algorithms, including the encoding algorithm, such as OHE (MLlib OHE) or count vectorizer (MLlib CV). In one embodiment, the SQL package 222 is the Spark™ SQL package for working with structured data. The other packages 223 may include Spark™ Streaming, GraphX, or the R programming language on the Spark™ distributed processing framework (SparkR), for example. Spark™ Streaming is an extension of the SparkTM core engine API that enables callable, high-throughput, fault-tolerant stream processing of live data streams. GraphX is a component for graphs and graph-parallel computation. At a high level, GraphX extends the RDD API 230 by introducing a new graph abstraction: a directed multigraph with properties attached to each vertex and edge. SparkR is a package that provides a light-weight frontend to use Apache Spark™ from the R programming language.

The main API provided by Spark SQL is DataFrame (DF) 210, which is a relational API over RDDs where the data is organized into the named columns. DF 210 is conceptually equivalent to a table in a relational database. The API enables automatic optimizations of the processing plan using well-established techniques from databases. Relational optimizers, such as the Apache Spark™ Catalyst optimizer, determine the most efficient plans for executing the set of relational statements by (i) reordering operations, (ii) reducing the amount of data that needs to be read, (iii) pruning unneeded partitioning, etc. Optimized execution plans lead to savings in compute resources (e.g., processing time, network bandwidth between driver and worker nodes, I/O, and memory).

The Spark™ distributed processing framework distinguishes between two types of operations that can be performed on an RDD/DF: transformations and actions. Transformations are lazy, meaning that their results are not immediately computed. Actions are eager, signifying immediate computation of results. Eager evaluation materializes the execution plan, and the core engine 240 cannot perform any optimization beyond materialization limits. Laziness enables control of network communication and storage requirements using the programming model. It brings optimization benefits through allowing query optimizers (e.g., Catalyst) to see the full picture and produce more optimized plans. Following are two examples that illustrate the benefits of the lazy approach.

1. Given a DF that contains the information on users (users_df), the goal is to return 10 records corresponding to users whose name is John. Related Spark™ SQL code is:
   users_df.filter(users_df.name=="John").limit(10).
   Spark™ SQL will not compute intermediate filtered results. Instead, as soon as 10 elements of the filtered data have been obtained, the result is ready.

2. Given a DF that contains the information on users (users_df), and a DF that contains information on events (events_df), the goal is to return users going to summer events. Related Spark™ SQL code is:
   users_df.join(events_df,
      users_df.event_id==events_df.id).filter
      (events_df.season=="summer"). Filtering is specified after the join operation, which is a costly shuffle operation. The Catalyst optimizer evaluates the physical plan and rearranges the operations such that filter is executed first, thus allowing the join operation to be performed on a smaller dataset.

In the examples above, Spark™ SQL analyzes and optimizes the chains of operations before executing them, thus saving time and space by computing only what is needed when it is needed. It is important to note that not all transformations are equal. Some transformations are more expensive, depending on how much data is moved (shuffled) from one node to another to perform certain operations. For instance, the join operation requires the entries from both joining datasets with a given key to reside on a single node prior to joining. Transformations with narrow dependencies (e.g., map, filter, etc.) are fast; they do not require shuffling and allow for different optimizations. Transformations with wide dependencies (e.g., groupBy, join, etc.) require all or some data to be shuffled over the network, which causes them to be slow. Partitioning strategies or code refactoring that avoid wide dependencies can provide the means to deal with shuffles efficiently.

Figure 3:
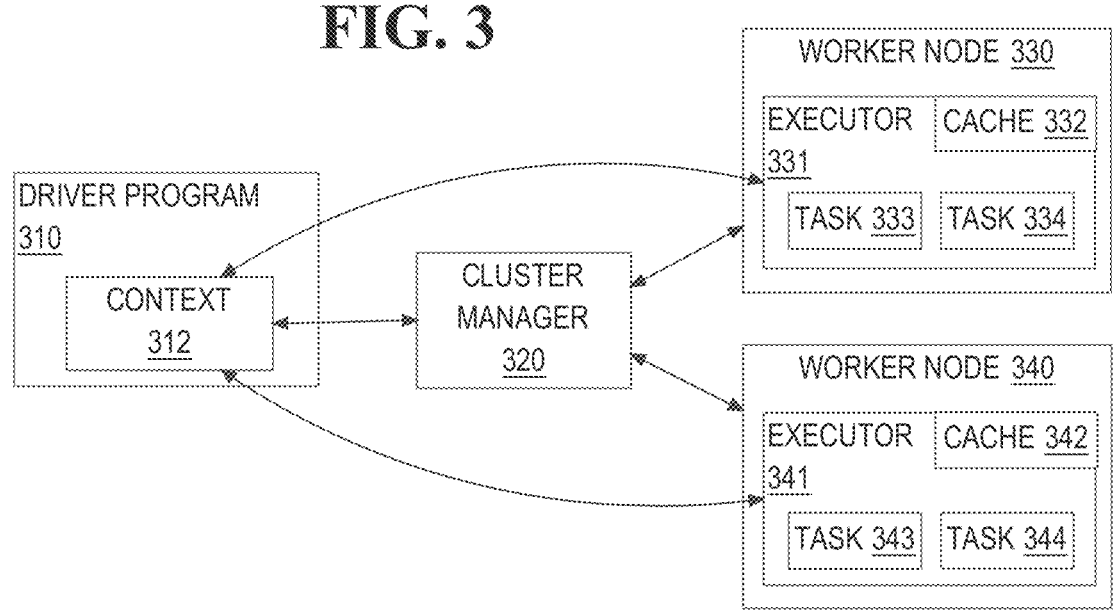
FIG. 3 illustrates a cluster topology in which aspects of the illustrative embodiments may be implemented.

FIG. 3 illustrates a cluster topology in which aspects of the illustrative embodiments may be implemented. The Spark™ distributed data processing framework is organized in a driver-worker topology. The driver program 310 is the node the developers interact with when writing programs. Applications run as independent sets of processes on a cluster, coordinated by a context object 312 in the driver program 310. To run on a cluster, the context 312 can connect to several types of cluster managers 320 (e.g., the Spark™ cluster manager, the Apache Mesos™ cluster manager, the Apache Hadoop® YARN cluster manager, the Kubernetes® containerized application management system), which allocate resources across applications. APACHE MESOS and APACHE HADOOP are trademarks of The Apache Software Foundation in the United States, other countries, or both. KUBERNETES is a registered trademark of the Linux Foundation in the United States and other countries. The cluster manager 320 is a point through which the driver program 310 and executors 331, 341 communicate. The cluster manager 320 is responsible for scheduling, managing resources, and performing bookkeeping.

Once connected, the distributed data processing framework acquires executors 331, 341 on worker nodes 330, 340 in the cluster. Executors 331, 341 are processes that run computations and store data for the application in caches 332, 342. Next, the driver program 310 sends application code to the executors 331, 341. Finally, the context 312 sends tasks 333, 334, 343, 344 to the executors 331, 341 to run.

Each application gets its own executor processes 331, 341, which stay up for the duration of the whole application and run tasks 333, 334, 343, 344 in multiple threads. This has the benefit of isolating applications from each other, on both the scheduling side (each driver program 310 schedules its own tasks) and executor side (tasks from different applications run in different Java™ virtual machines (JVMs)). However, it also means that data cannot be shared across different applications without writing it into an external storage system.

The data within an RDD/DF is split into several partitions. Partitions never span multiple machines, and each machine in the cluster contains one or more partitions (the number of partitions can be configured). There are two partitioning types in the Spark™ distributed data processing framework: hash and range partitioning. Hash partitioning is used by default, and it attempts to spread data evenly across partitions. Range partitioning is more efficient when data contains a defined ordering based on which the partitioning is performed.

When a job is submitted, the driver program 310 implicitly converts the code containing transformations and actions on an RDD/DF into a logical Directed Acyclic Graph (DAG). The driver program 310 also performs certain optimizations and then converts the logical DAG into a physical execution with a set of stages. A stage is a combination of transformations that does not cause any shuffling. When a transformation is applied on an RDD/DF, the transformation is applied to each of its partitions, meaning that a single task is spawned for a single partition (each stage contains as many tasks as partitions of the RDD/DF). The size of the partitions and their number can be changed based on the requirements of the application. Partitioning, however, is outside the scope of this description.

Eager evaluation uses an action (barrier mechanism) that prevents the query compiler from getting the entire picture of the logical plan and reordering the calculation in an optimal way. In such a setting, all nodes first calculate unique categories locally for each partition and then send the result to the driver side, which merges partial results. The driver becomes a bottleneck when there are many partitions and the data from each partition is large. Also, in such settings, it is essential to ensure that there is enough storage on the driver node to accept and process the results sent by the nodes.

The illustrative embodiment provides a lazy approach to OHE training to reduce the load on the driver side and related space requirements. By delaying the evaluation of an expression until its value is needed, different optimizations can take place. The illustrative embodiment provides categorical feature encoding using a lazy evaluation approach, which is beneficial in the case of OHE and in large-scale data environments. The categorical feature encoding approach of the illustrative embodiment provides an algorithm where materialization of the unique categories is not needed, and all processing steps can be evaluated lazily. In one embodiment, the algorithm is implemented using Spark™ relational API, DataFrames (DF), which together with the lazy evaluation allows for important performance benefits. In one embodiment, different optimization strategies are employed to boost computational performance in case of lazy evaluation involving wide transformations.

One-Hot Encoder Based on Lazy Evaluation

The illustrative embodiments provide a one-hot encoder (OHE) implementation based on the principles of lazy evaluation. In one embodiment, the OHE is implemented in the Spark™ distributed data processing framework via DataFrames (DF) API, which enables automatic optimization of the processing plan using well-established techniques from databases.

The process of the OHE has two phases: the training phase and the encoding phase. During the training phase, the computation of the encoder state for a given feature is performed. The generation of the encoder state includes executing a set of relational statements that are related to the extraction of unique categories. This step is followed by the association of a unique index to each category. Based on computed information, a sparse numerical encoding is computed for each category, and the state is updated accordingly. The resulting encoder state represents a DF itself.

Figure 4:
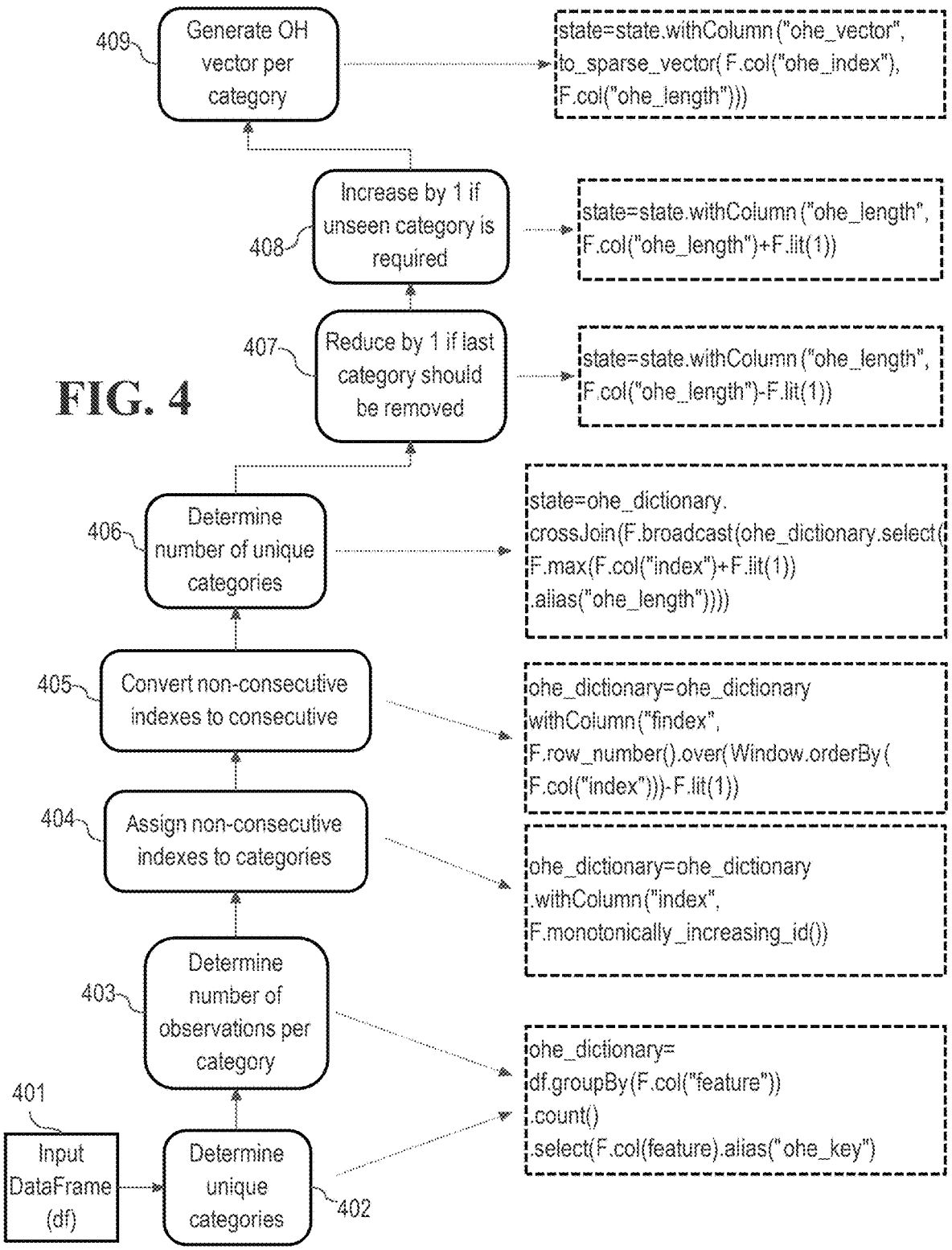
FIG. 4 illustrates a training phase for a one-hot encoder with corresponding code excerpts in accordance with an illustrative embodiment.

FIG. 4 illustrates a training phase for a one-hot encoder with corresponding code excerpts in accordance with an illustrative embodiment. The training phase begins with an input DataFrame 401 of a training data set. The input DF 401 is a dataset organized into named columns. It is conceptually equivalent to a table in a relational database or a data frame in R/Python but with richer optimizations. The input DF 401 can be constructed from a wide array of sources, such as structured data files, tables, external databases, or existing RDDs.

The training phase determines unique categories in the input DF (block 402) and determines a number of observations per category in the input DF (block 403). In the corresponding code excerpt shown in FIG. 4, the training phase uses a groupBy( ) function to collect identical data (the categorical feature, referred to as feature) into groups and perform aggregate functions on the group data. The count( ) function returns a count of rows for each group, resulting in a number of observations per category. The select( ) function is used to select one or multiple columns by index and assigns an alias of "ohe_key" to the feature column. This alias is used during the encoding phase to use the feature column as the join key.

The training phase then assigns non-consecutive indexes to the unique categories (block 404). In the corresponding code excerpt, the training phase uses a withColumn( ) function to add a new "index" column to the DF 401 with a monotonically-increasing identifier. The indexes, which are generated by the monotonically_increasing_id function, are not necessarily consecutive; therefore, the training phase converts the non-consecutive indexes to consecutive indexes (block 405). In the corresponding code excerpt, the training phase uses the withColumn( ) function to transform the monotonically-increasing index into the row_number minus 1 (one). The Window.orderBy( ) function ensures that the indexes are in a defined order. Assuming that the row numbers are monotonically increasing and consecutive beginning at a value of 1 (one), this converts the index into consecutive integers beginning with 0 (zero).

The training phase determines a number of unique categories in the resulting DF (block 406). In the corresponding code excerpt, the training phase uses the crossJoin( ) function to select the maximum index value, add 1 (one), and assign an alias of "ohe_length." The result of the crossJoin ( ) function is an added column for ohe_length containing the same value, set to the maximum index value+1, in each row. The broadcast( ) function sets a broadcast variable that is cached and available on all nodes in the cluster.

The training phase can reduce the number of unique categories by 1 (one) if the last category should be removed (block 407). The concept of multicollinearity refers to the occurrence of high intercorrelations among two or more independent variables, which can lead to skewed or misleading results by undermining the statistical significance of independent variables. In one embodiment, the OHE can encode one category as all zero values in the one-hot (OH) vector to avoid multicollinearity. This is sometimes referred to as "dummy encoding." Thus, the training phase can reduce the number of unique categories by one to reduce the number of elements in the OHE vector by one. In the corresponding code excerpt, the training phase uses the withColumn( ) function to reduce ohe_length by 1 (one).

The training phase can also increase the number of unique categories by 1 (one) if an unseen category is required (block 408). The unseen category is used to handle data that appear in the encoding phase that was not seen in the training phase. The training phase solves this by adding an unseen category. In the corresponding code excerpt, the training phase uses the withColumn( ) function to increase ohe_length by 1 (one).

The training phase then generates a one-hot (OH) vector per category (block 409). In the corresponding code excerpt, the training phase uses the withColumn( ) function to add an "ohe_vector" column to the DF. The training phase uses the to_sparse_vector( ) function to generate a sparse vector for each column having a vector length of ohe_length and a value of 1 (one) in an element corresponding to the ohe_index of the category. The resulting DataFrame includes the feature column, the ohe_index column, the ohe_length column, and the ohe_vector column. This resulting DataFrame is used as the encoder state for the one-hot encoder.

Figure 5:
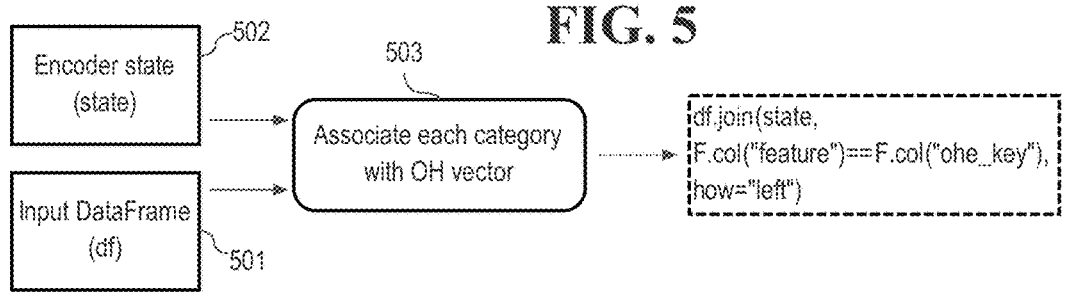
FIG. 5 illustrates an encoding phase for a one-hot encoder with corresponding code excerpts in accordance with an illustrative embodiment.

FIG. 5 illustrates an encoding phase for a one-hot encoder with corresponding code excerpts in accordance with an illustrative embodiment. During the encoding phase, the original feature is encoded based on the encoder state. The input DataFrame (DF) 501 is joined with the encoder state 502 using the feature value as the joining key to associate each category with a OH vector (block 503). In the corresponding code excerpt, the encoding phase uses the join( ) function to perform a left join to return all values from the left relation (Input DF 501) and the matched values from the right relation (state 502) or to append NULL if there is no match. The resulting DF includes a feature column from the input DF 501 and a column with the ohe_vector corresponding to each feature (category) from the encoder state 502.

In one embodiment, the encoding phase benefits from a distributed (broadcast) join, which allows for many lookups to be performed in parallel. Unlike the eager evaluation case where a reduction must take place and the state must be collected in a single machine and then broadcast, with the lazy approach, the query optimizer can work end-to-end and come up with a more efficient plan.

Figure 6:
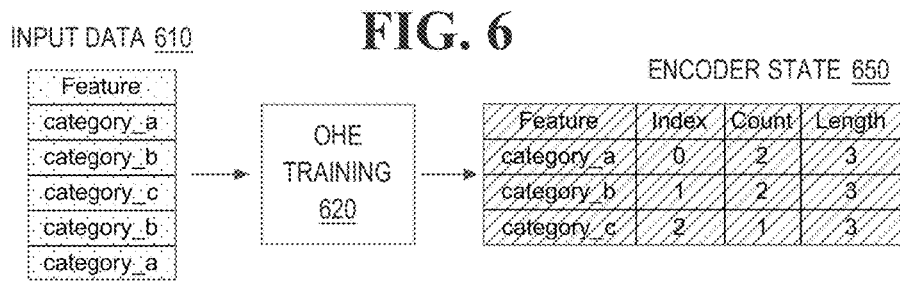
FIG. 6 illustrates an example one-hot encoder training result in accordance with an illustrative embodiment.

FIG. 6 illustrates an example one-hot encoder training result in accordance with an illustrative embodiment. In the training phase, different lazy operations (transformations) are chained to train the encoder and generate its state. The training steps are detailed above with reference to FIG. 4. OHE training 620 starts by creating a dictionary of distinct categories. For each distinct category ("Feature" in the input data 610 and encoder state 650), the training determines a number of observations ("Count" in encoder state 650), as well as a unique index ("Index" in encoder state 650).

The index is computed using a monotonically_increasing_id function that associates monotonically increasing but non-consecutive indexes to the unique categories in the encoder state 650. Having non-consecutive indexes is undesirable because it can cause the dimensions of resulting vectors to explode. Thus, the OHE training 620 converts the non-consecutive indexes to consecutive indexes ("Index" in encoder state 650) by ranking the categories.

The OHE training 620 appends a column that contains the number of elements in the dictionary ("Length" in encoder state 650). The index and the number of elements in the dictionary are used when creating a sparse vector representation of each category ("OHE Vector" in encoder state 650). The index determines the element in the one-hot vector having a value of 1. The length determines the size of the OHE vector.

In one embodiment, the encoder state table 650 is a DataFrame (DF) that is computed once an action triggers the computation. Being a DF, the encoder state table 650 remains distributed. This is different from collections computed in eager evaluation approaches (e.g., MLlib CV and MLlib OHE), which are materialized in the training phase and collected to a driver node, thus posing a significant load on the driver side and affecting network communication.

Figure 7:
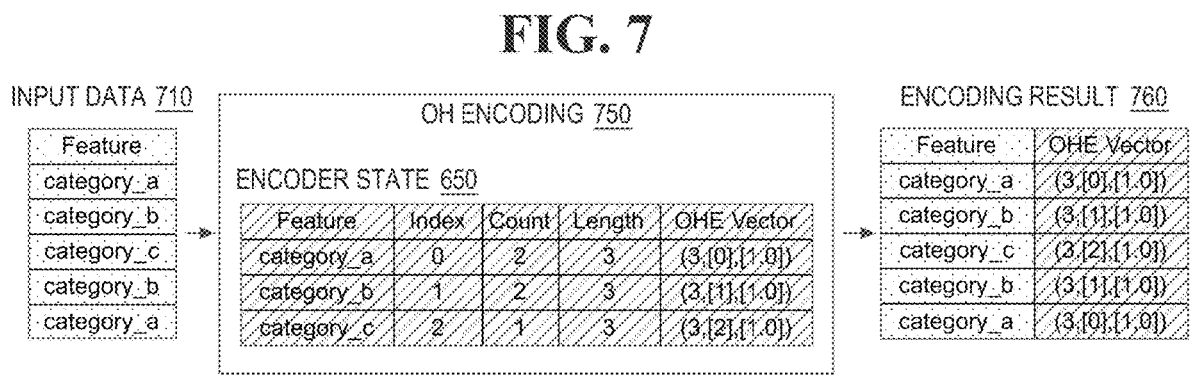
FIG. 7 illustrates an example one-hot encoding result in accordance with an illustrative embodiment.

FIG. 7 illustrates an example one-hot encoding result in accordance with an illustrative embodiment. In the depicted example, the one-hot (OH) encoding 750 is based on a (left) join operation between the input data 710 and the state of the trained encoder, encoder state 650. The value of a categorical feature is used as a join key. As a result, a new column ("OHE Vector" in encoding result 760) containing sparse vector representation for each value of a categorical feature ("Feature" in input data 710) is obtained.

The OHE of the illustrative embodiments also supports different strategies for handling unseen values as part of the one-hot encoding. The encoded columns can either contain NULL values, empty vectors with all zeros, or a separate category for unseen values. Additionally, the OHE of the illustrative embodiments supports the removal of the last category from the encoder state, which can be beneficial in some circumstances (e.g., when collinear features cause problems).

Lazy One-Hot Encoder Results

The one-hot encoder of the illustrative embodiments uses a distributed data processing framework with query optimizations and a lazy approach. This allows the distributed data processing framework to analyze and optimize the provided chain of operations before executing them. Optimizations provide a way to (i) reduce storage requirements and (ii) limit the driver load and network communication, which otherwise could cause serious performance bottlenecks.

The one-hot encoder of the illustrative embodiments also uses a relational approach via the Spark™ DataFrame API, which is based on well-established techniques from databases that bring automatic optimizations that lead to improved performance. Relational optimizers (e.g., Catalyst) determine the most efficient plans for executing the set of relational statements by (i) reordering operations, (ii) reducing the amount of data that must be read, (iii) pruning unneeded partitioning, etc. Optimized execution plans lead to savings in compute resources (e.g., processing time, network bandwidth between driver and worker nodes, I/O, and memory).

In one implementation, the lazy OHE of the illustrative embodiments can be applied to the context of log-based anomaly detection, where the lazy OHE leads to a more efficient feature extraction process. The log-based anomaly detection use case is associated with large datasets and high cardinality of categorical features, which are productively handled with the lazy OHE of the illustrative embodiments. The lazy OHE of the illustrative embodiments is not limited to anomaly detection and is applicable to all use cases where the encoding of categorical features, especially at scale, is required.

FIGS. 8-10 show results of experiments to empirically evaluate the lazy OHE approach and present the results of the most representative experiments. FIG. 8 is a table showing results of existing encoding approaches and a lazy one-hot encoder where cardinality of a considered feature equals sample size in accordance with an illustrative embodiment. More specifically, the table of FIG. 8 shows the results of MLlib CV, MLlib OHE, and the lazy OHE of the illustrative embodiments, where a feature with all unique values is encoded (feature cardinality equal to the sample size). The data is generated using Universally Unique Identifier generator. The results of the experiment are reported for different sample sizes. The results suggest that the MLlib methods are good choices for lower cardinalities, but they become impractical when the cardinality increases. The experiments with the sample size of 50000 and higher have demonstrated the incapability of MLlib OHE to scale (execution times start to explode). The experiments with the sample size of 50000000 and higher pinpoint the drawbacks associated with the MLlib CV method, as experiments fail to execute due to memory issues.

FIG. 9 is a table showing results where a feature with fixed cardinality is encoded in accordance with an illustrative embodiment. A set of 10000 (cardinality of 10000) unique values is generated using Universally Unique Identifier generator. Datasets of different sizes are then computed by sampling randomly from the generated set with replacement. The experiment results are reported for considered sample sizes. The MLlib methods appear to be good choices for lower sample sizes. MLlib CV, however, becomes inferior to the lazy OHE when sample size is equal to or greater than 10 million. Lazy OHE is also more efficient than the MLlib OHE method when sample sizes are equal to or greater than 1 million.

The main disadvantage of the lazy OHE approach is the use of wide transformations (e.g., join, groupBy). These operations can be expensive given that they can cause the rearrangement of data between partitions known as data shuffle. Spark™ partitioning strategies or code refactoring to avoid wide transformations can, however, provide the means to deal with this drawback efficiently.

In some embodiments, different optimizations related to wide transformations are attempted in the implementation of the lazy OHE. The optimizations include:
1. Replacing the regular join operation with broadcastJoin to reduce data shuffling and related network communication.
2. Replacing groupBy-count operations in fit stage with the distinct operation to limit network communication.
3. Using explicit projection before groupBy so that only necessary columns are kept in the DF, thus directly affecting network traffic.
4. Replacing crossJoin with a subquery.

The optimizations related to the usage of broadcastJoin (1) and distinct (2) operations have demonstrated significant improvements in terms of execution times compared to the original unoptimized lazy implementation. FIG. 10 is a table showing results related to improvements for optimized lazy one-hot encoder in accordance with an illustrative embodiment. The optimizations related to explicit projection and the usage of subqueries did not lead to any notable improvements.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
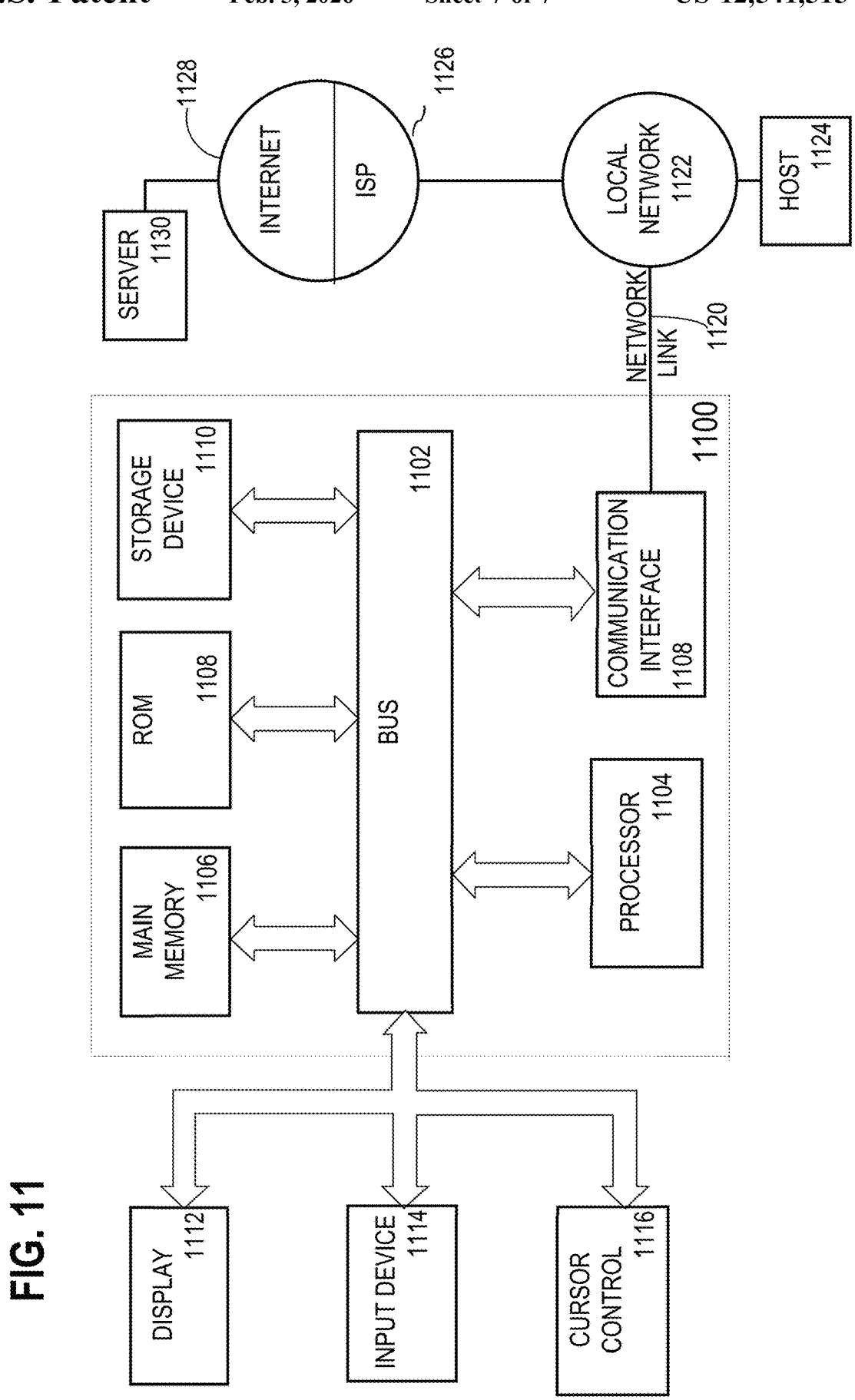
FIG. 11 is a block diagram that illustrates a computer system upon which an embodiment of the invention may be implemented.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general-purpose microprocessor.

Computer system 1100 also includes a main memory 1106, such as a random-access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk, optical disk, or solid-state drive is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1110. Volatile media includes dynamic memory, such as main memory 1106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid-state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
during a training phase, performing computation of an encoder state table by executing a set of relational statements to extract unique categories in a first data set, associate each unique category with a unique index, and generate a one-hot encoding for each unique category, wherein the encoder state table includes a category column storing the unique categories and a one-hot vector column storing a sparse vector corresponding to each unique category;
during an encoding phase, encoding a set of categorical features in a second data set based on the encoder state table to form a set of encoded categorical features, wherein encoding the set of categorical features comprises:
generating an input data frame for the set of categorical features in the second data set; and
performing a distributed join operation between the input data frame and the encoder state table using values of the categorical features as join key values, wherein the method is performed by one or more computing devices.

2. The method of claim 1, wherein the encoder state table further includes at least one of an index column storing consecutive indexes corresponding to the unique categories or a length column storing a length of the sparse vector.

3. The method of claim 1, wherein:
the set of relational statements are further executed to generate a one-hot encoder dictionary by determining a number of observations in the first data set for each unique category; and
the encoder state table further includes a count column storing a number of observations corresponding to each unique category.

4. The method of claim 1, wherein performing the distributed join operation comprises executing a plurality of lookup operations in parallel.

5. The method of claim 1, wherein:
the distributed join operation is performed by a query optimization engine,
performing the distributed join operation comprises executing a plurality of lookup operations, and
the query optimization engine implements one or more optimizations when executing the plurality of lookup operations.

6. The method of claim 1, wherein:
the distributed join operation is performed by a query optimization engine,
performing the distributed join operation comprises executing a plurality of lookup operations; and
execution of the plurality of lookup operations is postponed until a result of each lookup operation is needed.

7. The method of claim 1, wherein:
the set of relational statements are executed by a query optimization engine, and the query optimization engine implements one or more optimizations when executing the set of
relational statements during the training phase.

8. The method of claim 1, wherein the set of relational statements are executed to generate a one-hot encoder dictionary by:
determining a plurality of unique categories in the first data set;
assigning monotonically increasing indexes to the plurality of unique categories; and
converting the monotonically increasing indexes to consecutive indexes.

9. The method of claim 8, wherein the one-hot encoding for a given category comprises a sparse vector having a length based on a number of unique categories in the plurality of unique categories and a value of one in an element of the sparse vector according to an index of the given category.

10. The method of claim 1, further comprising training a machine learning model using the second data set based on the set of encoded categorical features.

11. One or more non-transitory computer-readable media storing instructions which, when executed by one or more processors, causes performance of:
during a training phase, performing computation of an encoder state table by executing a set of relational statements to extract unique categories in a first data set, associate each unique category with a unique index, and generate a one-hot encoding for each unique category, wherein the encoder state table includes a category column storing the unique categories and a one-hot vector column storing a sparse vector corresponding to each unique category;
during an encoding phase, encoding a set of categorical features in a second data set based on the encoder state table to form a set of encoded categorical features, wherein encoding the set of categorical features comprises:
generating an input data frame for the set of categorical features in the second data set; and
performing a distributed join operation between the input data frame and the encoder state table using values of the categorical features as join key values.

12. The one or more non-transitory computer-readable media of claim 11, wherein the encoder state table further includes at least one of an index column storing consecutive indexes corresponding to the unique categories or a length column storing a length of the sparse vector.

13. The one or more non-transitory computer-readable media of claim 11, wherein:
the set of relational statements are further executed to generate a one-hot encoder dictionary by determining a number of observations in the first data set for each unique category; and
the encoder state table further includes a count column storing a number of observations corresponding to each unique category.

14. The one or more non-transitory computer-readable media of claim 11, wherein performing the distributed join operation comprises executing a plurality of lookup operations in parallel.

15. The one or more non-transitory computer-readable media of claim 11, wherein:
the distributed join operation is performed by a query optimization engine,
performing the distributed join operation comprises executing a plurality of lookup operations, and
the query optimization engine implements one or more optimizations when executing the plurality of lookup operations.

16. The one or more non-transitory computer-readable media of claim 11, wherein:
the distributed join operation is performed by a query optimization engine,
performing the distributed join operation comprises executing a plurality of lookup operations; and execution of the plurality of lookup operations is postponed until a result of each lookup operation is needed.

17. The one or more non-transitory computer-readable media of claim 11, wherein:
the set of relational statements are executed by a query optimization engine, and the query optimization engine implements one or more optimizations when executing the set of
relational statements during the training phase.

18. The one or more non-transitory computer-readable media of claim 11, wherein the set of relational statements are executed to generate a one-hot encoder dictionary by:
determining a plurality of unique categories in the first data set;
assigning monotonically increasing indexes to the plurality of unique categories; and
converting the monotonically increasing indexes to consecutive indexes.

19. The one or more non-transitory computer-readable media of claim 18, wherein the one-hot encoding for a given category comprises a sparse vector having a length based on a number of unique categories in the plurality of unique categories and a value of one in an element of the sparse vector according to an index of the given category.

20. The one or more non-transitory computer-readable media of claim 11, wherein the instructions further cause performance of:
training a machine learning model using the second data set based on the set of encoded categorical features.

* * * * *